(12) United States Patent
Juan et al.

(10) Patent No.: US 11,993,674 B2
(45) Date of Patent: May 28, 2024

(54) FUNCTIONAL RESIN MATERIAL, MANUFACTURING METHOD THEREOF, AND MOISTURE-SENSED SHRINKING FABRIC

(71) Applicant: TAIWAN TEXTILE RESEARCH INSTITUTE, New Taipei (TW)

(72) Inventors: Sun-Wen Juan, New Taipei (TW); Chun-Hung Lin, New Taipei (TW); Yi-Ching Sung, New Taipei (TW)

(73) Assignee: TAIWAN TEXTILE RESEARCH INSTITUTE, New Taipei (TW)

( * ) Notice: Subject to any disclaimer, the term of this patent is extended or adjusted under 35 U.S.C. 154(b) by 918 days.

(21) Appl. No.: 17/029,148

(22) Filed: Sep. 23, 2020

(65) Prior Publication Data
US 2022/0010050 A1    Jan. 13, 2022

(30) Foreign Application Priority Data
Jul. 13, 2020  (TW) ................ 109123623

(51) Int. Cl.
| | | |
|---|---|---|
| C08G 18/32 | (2006.01) |
| B82Y 40/00 | (2011.01) |
| C08G 18/40 | (2006.01) |
| C08G 18/48 | (2006.01) |
| C08G 18/64 | (2006.01) |
| C08G 18/79 | (2006.01) |
| C08G 73/06 | (2006.01) |
| D06B 3/10 | (2006.01) |
| D06M 13/148 | (2006.01) |
| D06M 13/17 | (2006.01) |
| D06M 13/395 | (2006.01) |
| D06M 15/05 | (2006.01) |
| D06M 15/53 | (2006.01) |
| D06M 15/564 | (2006.01) |
| D06M 15/568 | (2006.01) |
| D06M 15/59 | (2006.01) |
| D06M 15/592 | (2006.01) |
| D06M 15/61 | (2006.01) |
| D06M 23/08 | (2006.01) |
| D06M 101/32 | (2006.01) |

(52) U.S. Cl.
CPC ....... *C08G 18/325* (2013.01); *C08G 18/3203* (2013.01); *C08G 18/3228* (2013.01); *C08G 18/4081* (2013.01); *C08G 18/4825* (2013.01); *C08G 18/4833* (2013.01); *C08G 18/4854* (2013.01); *C08G 18/6423* (2013.01); *C08G 18/6484* (2013.01); *C08G 18/792* (2013.01); *C08G 18/794* (2013.01); *C08G 18/795* (2013.01); *C08G 73/0644* (2013.01); *D06B 3/10* (2013.01); *D06M 13/148* (2013.01); *D06M 15/05* (2013.01); *D06M 15/53* (2013.01); *D06M 15/564* (2013.01); *D06M 15/568* (2013.01); *D06M 15/61* (2013.01); *D06M 23/08* (2013.01); *B82Y 40/00* (2013.01); *D06M 13/17* (2013.01); *D06M 13/395* (2013.01); *D06M 15/59* (2013.01); *D06M 15/592* (2013.01); *D06M 2101/32* (2013.01)

(58) Field of Classification Search
CPC .............. C08G 18/325; C08G 18/3203; C08G 73/0644; C08G 18/3228; C08G 18/4081; C08G 18/4825; C08G 18/4833; C08G 18/4854; C08G 18/6423; C08G 18/6484; C08G 18/792; C08G 18/794; C08G 18/795; D06B 3/10; B82Y 40/00; D06M 15/564; D06M 13/17; D06M 13/395; D06M 13/148; D06M 15/59; D06M 15/592; D06M 15/05; D06M 23/08; D06M 15/53; D06M 15/568; D06M 15/61; D06M 2101/32
See application file for complete search history.

(56) References Cited

U.S. PATENT DOCUMENTS

| | | |
|---|---|---|
| 8,784,956 B2 | 7/2014 | Saitou et al. |
| 9,527,328 B2 | 12/2016 | Lubnin et al. |
| 10,640,667 B1 | 5/2020 | Lin et al. |
| 2009/0276936 A1 | 11/2009 | Makida |

(Continued)

FOREIGN PATENT DOCUMENTS

| | | |
|---|---|---|
| CN | 102465457 A | 5/2012 |
| CN | 104837637 A | 8/2015 |

(Continued)

OTHER PUBLICATIONS

Huntsman Jeffamine, D-2000 Polyetheramine (Year 2007); pp. 1-2.

*Primary Examiner* — Rabon A Sergent
(74) *Attorney, Agent, or Firm* — McClure, Qualey & Rodack, LLP

(57) ABSTRACT

A functional resin material is manufactured by the following reagents including a polyol, a polyamine, a first cross-linking agent, a second cross-linking agent, and a nanocellulose. Each of the first cross-linking agent and the second cross-linking agent includes an isocyanate block. The nanocellulose includes a repeating unit represented by formula (1),

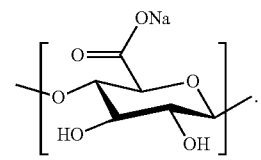

formula (1)

17 Claims, 1 Drawing Sheet

(56) References Cited

U.S. PATENT DOCUMENTS

| | | |
|---|---|---|
| 2010/0048765 A1 | 2/2010 | Lubnin et al. |
| 2011/0124799 A1 | 5/2011 | Li |
| 2014/0106138 A1 | 4/2014 | Chung |
| 2015/0210032 A1 | 7/2015 | Blackford |
| 2015/0299948 A1 | 10/2015 | Pan et al. |
| 2017/0245724 A1 | 8/2017 | Carrozzella et al. |
| 2018/0371280 A1 | 12/2018 | Garzon et al. |
| 2019/0352528 A1 | 11/2019 | Yamazaki |

FOREIGN PATENT DOCUMENTS

| | | | |
|---|---|---|---|
| CN | 106687494 A | 5/2017 | |
| CN | 109153908 A | 1/2019 | |
| CN | 111057412 A | 4/2020 | |
| CN | 111350080 A | 6/2020 | |
| EP | 1894482 A2 | 3/2008 | |
| JP | 2019085530 A | 6/2019 | |
| KR | 10-2016-0116089 A | * 10/2016 | |
| TW | 201224056 A | 6/2012 | |
| WO | WO-2019216700 A1 | * 11/2019 | ............ B01F 17/00 |

* cited by examiner

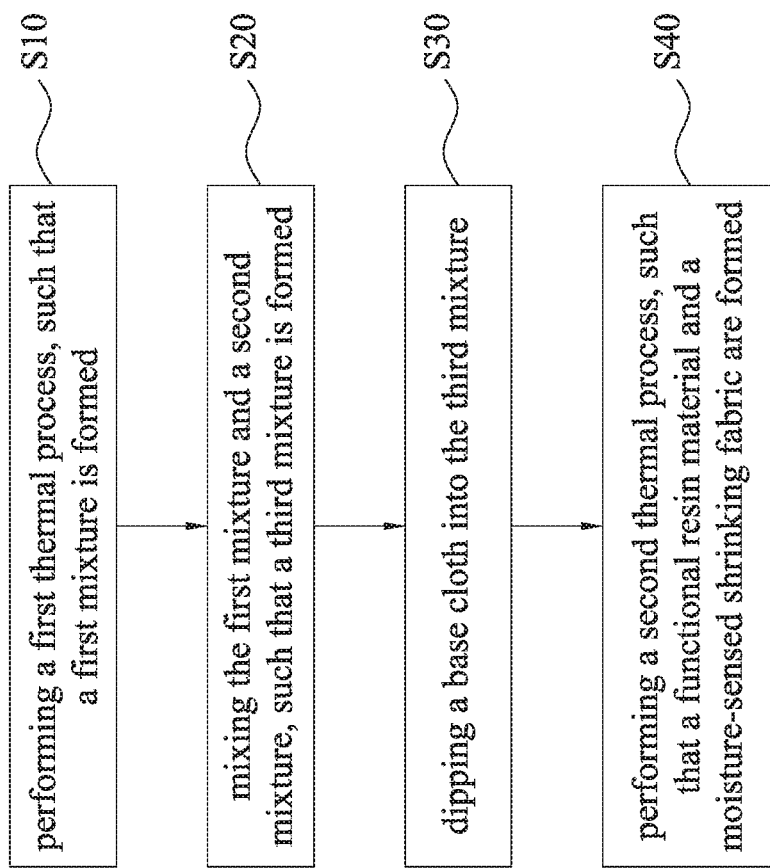

FUNCTIONAL RESIN MATERIAL, MANUFACTURING METHOD THEREOF, AND MOISTURE-SENSED SHRINKING FABRIC

RELATED APPLICATION

This application claims priority to Taiwan Application Serial Number 109123623, filed Jul. 13, 2020, which is herein incorporated by reference.

BACKGROUND

Field of Invention

The present disclosure relates to a textile material, and particularly relates to a functional resin material, a manufacturing method of the resin material, and a moisture-sensed shrinking fabric manufactured by the functional resin material.

Description of Related Art

With the improvement of the living standard in today, people's demand for functional textiles gradually increases, and with the continuous coming out of the various functional textiles, the development of the functional textiles with specific purposes has also become more and more complete.

For wearable textiles, they are often adhered to the user's skin as the user's sweat or environmental humidity increases, resulting in a significant reduction in wearing comfort. Therefore, how to reduce the adhesion between the wearable textile and the user's body and thereby improving the wearing comfort is an important issue for the textile industry.

SUMMARY

The present disclosure provides a functional resin material, which can be firmly disposed on a base cloth, such that the moisture-sensed shrinking fabric manufactured by the functional resin material has good moisture-sensed shrinking property and washing fastness.

According to some embodiments of the present disclosure, the functional resin material is manufactured by the following reagents including a polyol, a polyamine, a first cross-linking agent, a second cross-linking agent, and a nanocellulose. Each of the first cross-linking agent and the second cross-linking agent includes a isocyanate block. The nanocellulose includes a repeating unit represented by formula (1),

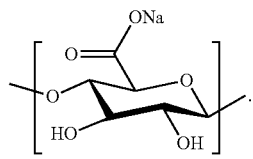

formula (1)

In some embodiments of the present disclosure, a particle diameter of the nanocellulose is between 16 nm and 20 nm.

In some embodiments of the present disclosure, an average molecular weight of the polyamine is between 600 g/mole and 8000 g/mole.

In some embodiments of the present disclosure, the first cross-linking agent and the second cross-linking agent have a same molecular structure.

In some embodiments of the present disclosure, an average molecular weight of the polyol is between 2000 g/mole and 10000 g/mole.

In some embodiments of the present disclosure, the polyol is a ether polyol including polyethylene glycol, polypropylene glycol, or poly(tetramethylene ether) glycol.

In some embodiments of the present disclosure, the polyamine includes fatty amine, polyetheramine, polyamide, or polyimide.

In some embodiments of the present disclosure, the fatty amine is hexamethylenediaine, diethylhexamethylenediamine, trimethylhexamethylenediamine, heptamethylenediamine, trimethylethylenediamine, nonamethylenediamine, tetramethylethylenediamine, tetraethylethylenediamine, laurylamine dipropylenediamine, diethylenetriamine, triethylenetetramine, or polyethyleneimine.

According to some embodiments of the present disclosure, the manufacturing method of the functional resin material includes the following steps. Performing a first thermal process to mix a polyol, a first cross-linking agent, and a nanocellulose, such that a first mixture is formed, in which a reaction temperature of the first thermal process is between 90° C. and 120° C. Performing a second thermal process to mix the first mixture and a second mixture, such that the functional resin material is formed, in which the second mixture includes a second cross-linking agent and a polyamine, and a reaction temperature of the second thermal process is between 120° C. and 150° C.

In some embodiments of the present disclosure, the first cross-linking agent and the second cross-linking agent have a same molecular structure.

In some embodiments of the present disclosure, each of the first cross-linking agent and the second cross-linking agent includes a structural unit represented by formula (2),

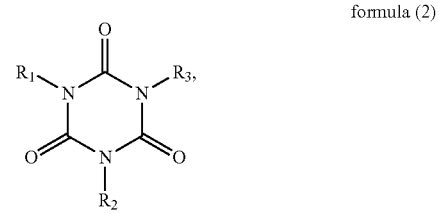

formula (2)

in which any two or more of the $R_1$, $R_2$, and $R_3$ includes an isocyanate block.

In some embodiments of the present disclosure, an usage amount of the first cross-linking agent is between 2.2 parts by weight and 2.6 parts by weight, and an usage amount of the second cross-linking agent is between 0.4 parts by weight and 0.8 parts by weight.

In some embodiments of the present disclosure, an usage amount of the polyol is between 0.5 parts by weight and 1.5 parts by weight, an usage amount of the polyamine is between 2 parts by weight and 4 parts by weight, and an usage amount of the nanocellulose is between 0.01 parts by weight and 0.05 parts by weight.

In some embodiments of the present disclosure, each of the first cross-linking agent and the second cross-linking agent includes an isocyanate block, each of the polyol and the nanocellulose includes a hydroxyl group, and a ratio of a total number of the isocyanate block to a total number of the hydroxyl group is between 1.0 and 2.5.

In some embodiments of the present disclosure, a reaction time of the first thermal process is between 10 minutes and 30 minutes, and a reaction time of the second thermal process is between 2 minutes and 5 minutes.

According to some embodiments of the present disclosure, the moisture-sensed shrinking fabric is manufactured by a manufacturing method including the following steps. Performing a first thermal process to mix a polyol, a first cross-linking agent, and a nanocellulose, such that a first mixture is formed, in which a reaction temperature of the first thermal process is between 90° C. and 120° C. Mixing the first mixture and a second mixture, such that a third mixture is formed, in which the second mixture comprises a second cross-linking agent and a polyamine. Dipping a base cloth into the third mixture, such that the third mixture covers the base cloth and infiltrates into the base cloth. Performing a second thermal process, such that the third mixture is formed into a functional resin material, and the functional resin material is disposed on the base cloth to form the moisture-sensed shrinking fabric, wherein a reaction temperature of the second thermal process is between 120° C. and 150° C.

In some embodiments of the present disclosure, the base cloth has at least two layers, and the functional resin material is disposed between the two layers of the base cloth.

In some embodiments of the present disclosure, a particle diameter of the nanocellulose is between 16 nm and 20 nm.

In some embodiments of the present disclosure, an average molecular weight of the polyamine is between 600 g/mole and 8000 g/mole.

In some embodiments of the present disclosure, a viscosity of the third mixture is between 5 cP and 25 cP.

In the aforementioned embodiments of the present disclosure, the moisture-sensed shrinking fabric includes the base cloth and the functional resin material. Since the functional resin material firmly disposed on the base cloth has a plurality of amino groups and hydroxyl groups, the moisture-sensed shrinking property of the moisture-sensed shrinking fabric can be improved, and the distance between the user's skin and the moisture-sensed shrinking fabric in a high-humidity environment can be enlarged, thereby enhancing the user's wearing comfort. During the manufacturing process of the moisture-sensed shrinking fabric, the functional resin material can be ensured to have a complicated network structure and thereby being firmly disposed on the base cloth by adjusting the reaction temperature of each stage of the two-stage thermal process, which is beneficial for improving the washing fastness of the moisture-sensed shrinking fabric. Accordingly, the moisture-sensed shrinking fabric of the present disclosure can still maintain its functions well after multiple times of washing, and can be widely used in the field of functional apparel textiles.

BRIEF DESCRIPTION OF THE DRAWINGS

The disclosure can be more fully understood by reading the following detailed description of the embodiments, with reference made to the accompanying drawings as follows:

FIG. 1 is a flowchart illustrating a manufacturing method of a moisture-sensed shrinking fabric according to some embodiments of the present disclosure.

DETAILED DESCRIPTION

Reference will now be made in detail to the present embodiments of the disclosure, examples of which are illustrated in the accompanying drawings. Wherever possible, the same reference numbers are used in the drawings and the description to refer to the same or like parts.

In the present disclosure, the structure of a polymer or a functional group is sometimes represented by a skeleton formula. This representation can omit carbon atoms, hydrogen atoms, and carbon-hydrogen bonds. Certainly, if the atom or atom group is dearly drawn in the structural formula, the drawing shall prevail.

The present disclosure provides a functional resin material which has a plurality of amino groups and hydroxyl groups and which can be firmly disposed on the base cloth, thereby improving the moisture-sensed shrinking property and washing fastness of the moisture-sensed shrinking fabric manufactured by the functional resin material. Compared to the conventional moisture-sensed shrinking fabric, the moisture-sensed shrinking fabric of the present disclosure has a high shrinking ratio per unit-area, and can well maintain its moisture-sensed shrinking property after multiple times of washing.

FIG. 1 is a flowchart illustrating a manufacturing method of a moisture-sensed shrinking fabric according to some embodiments of the present disclosure. Reference is made to FIG. 1. The manufacturing method of the moisture-sensed shrinking fabric includes steps S10 to S40. In step S10, a first thermal process is performed, such that a first mixture is formed. In step S20, the first mixture and a second mixture are mixed, such that a third mixture is formed. In step S30, a base cloth is dipped into the third mixture. In step S40, a second thermal process is performed, such that the functional resin material and the moisture-sensed shrinking fabric are formed. The aforementioned steps will further be discussed in the following descriptions.

Firstly, a polyol, a nanocellulose, and a first cross-linking agent are provided. In some embodiments, the polyol may be, for example, a ether polyol including polyethylene glycol (PEG), polypropylene glycol (PPG), or poly(tetramethylene ether) glycol (PTMEG), thereby providing the functional resin material with a good moisture-sensed shrinking property. In some embodiments, an average molecular weight of the polyol may be between 2000 g/mole and 10000 g/mole. In detail, since the polyol has a hydroxyl group which can be preserved in the functional resin material formed subsequently, the polyol can provide the functional resin material with a good moisture-sensed shrinking property, thereby enhancing the shrinking ratio per unit-area of the moisture-sensed shrinking fabric manufactured by the functional resin material.

The nanocellulose includes a repeating unit represented by formula (1),

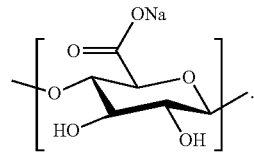

formula (1)

In some embodiments, a particle diameter of the nanocellulose y be between 16 nm and 20 nm to provide good reactivity. In detail, since the nanocellulose has a plurality of hydroxyl groups which can be preserved in the functional resin material formed subsequently, the nanocellulose can provide the functional resin material with a good moisture-sensed shrinking property, thereby enhancing the shrinking ratio per unit-area of the moisture-sensed shrinking fabric manufactured by the functional resin material.

In some embodiments, the first cross-linking agent may include isocyanate trimer. Specifically, the first cross-linking agent may include a structural unit represented by formula (2),

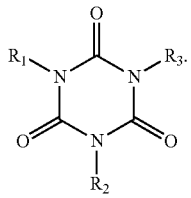

formula (2)

In some embodiments, the first cross-linking agent may include aliphatic isocyanate (e.g., HDI, TMDI or XDI) trimer, alicyclic isocyanate (e.g., IPDI, HMDI or HTDI) trimer, aromatic isocyanate (e.g., TDI or MDI) trimer, or combinations thereof. The first cross-linking agent includes an isocyanate block. For example, at least two terminals of the isocyanate timer may have the isocyanate blocks. Specifically, in the first cross-linking agent represented by formula (2), any two or more of R1, R2, and R3 include the isocyanate blocks.

Next, the first thermal process is performed in step S10 to mix the polyol, the nanocellulose, and the first cross-linking agent, such that the first mixture is formed, in which a reaction temperature of the first thermal process is between 90° C. and 120° C. In some embodiments, an usage amount of the polyol may be between 0.5 parts by weight and 1.5 parts by weight, an usage amount of the nanocellulose may be between 0.01 parts by weight and 0.05 parts by weight, and an usage amount of the first cross-linking agent may be between 2.2 parts by weight and 2.6 parts by weight. In some embodiments, a reaction time of the first thermal process may be between 10 minutes and 30 minutes, so as to ensure that the reaction proceeds to a certain extent.

During the first thermal process, the first cross-linking agent can react with the hydroxyl groups of the polyol and the nanocellulose, thereby forming the first mixture. As mentioned above, since the weight average molecular weight of the polyol may be between 2000 g/mole and 10000 g/mole, the moisture-sensed shrinking fabric formed subsequently can have good moisture-sensed shrinking property, washing fastness, and softness, and the manufacturing costs can be effectively reduced. Specifically, if the average molecular weight of the polyol is less than 2000 g/mole, the functional resin material formed subsequently may not be firmly disposed on the base cloth, and hence the moisture-sensed shrinking fabric has poor moisture-sensed shrinking property and washing fastness; and if the average molecular weight of the polyol is greater than 10000 g/mole, the moisture-sensed shrinking fabric may have poor softness, and the required reaction time is likely to increase, which is not beneficial for reducing the manufacturing costs.

Then, mixing the first mixture and the second mixture in step S20 to form the third mixture, in which the second mixture includes a second cross-linking agent and a polyamine. The second cross-linking agent can increase the chain length and the cross-linking degree of the functional resin material during the subsequent thermal process, such that the functional resin material is even more firmly disposed on the base cloth to improve the moisture-sensed shrinking property and the washing fastness of the moisture-sensed shrinking fabric. On the other hand, the amino group of the polyamine can be preserved in the functional resin material formed subsequently to provide the functional resin material with a good moisture-sensed shrinking property, thereby enhancing the shrinking ratio per unit-area of the moisture-sensed shrinking fabric manufactured by the functional resin material. In some embodiments, an usage amount of the second cross-linking agent may be between 0.4 parts by weight and 0.8 parts by weight, and an usage amount of the polyamine may be between 2 parts by weight and 4 parts by weight.

In some embodiments, the second cross-linking agent may include isocyanate trimer. Specifically, the second cross-linking agent may include a structural unit represented by formula (2),

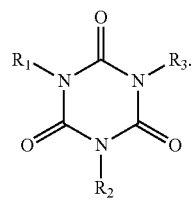

formula (2)

In some embodiments, the second cross-linking agent may include aliphatic isocyanate (e.g., HDI, TMDI or XDI) trimer, alicyclic isocyanate (e.g., IPDI, HMDI or HTDI) trimer, aromatic isocyanate (e.g., TDI or MDI) trimer, or combinations thereof. The second cross-linking agent includes an isocyanate block. For example, at least two terminals of the isocyanate trimer may have the isocyanate blocks. Specifically, in the second cross-linking agent represented by formula (2), any two or more of R1, R2, and R3 include the isocyanate blocks.

In some embodiments, the second cross-linking agent and the first cross-linking agent may have the same molecular structure. In some embodiments, a ratio of the usage amount of the second cross-linking agent to the usage amount of the first cross-linking agent may be, for example, between 1:5 and 1:3. In some embodiments, a ratio of a total number of the isocyanate block to a total number of the hydroxyl group is between 1.0 and 2.5.

In some embodiments, the polyamine may include polyetheramine, polyamide, or polyimide. In some other embodiments, the polyamine may include fatty amine, so as to better provide the functional resin material with a good moisture-sensed shrinking property. Specifically, the fatty amine may be, for example, hexamethylenediamine, diethylhexamethylenediamine, trimethylhexamethylenediamine, heptamethylenediamine, trimethylethylenediamine, nonamethylenediamine, tetramethylethylenediamine, tetraethylethylenediamine, laurylamine dipropylenediamine, diethylenetriamine, triethylenetetramine, or polyethyleneimine. In some embodiments, an average molecular weight of the polyamine is between 600 g/mole and 8000 Oriole, and preferably between 800 g/mole and 5500 g/mole.

After that, dipping the base cloth into the third mixture in step S30, such that the third mixture covers the base cloth and infiltrates into the base cloth, in which the base cloth may include knitted fabric, woven fabric, non-woven fabric, etc. In detail, when the base cloth is dipped into the third mixture, each ingredient in the third mixture can be attached to the surface of each fiber or yarn. In some embodiments, a base material of the base cloth may be, for example, polyethylene terephthalate, so as to prevent the base cloth from chemically reacting with the ingredients in the third mixture during the subsequent thermal process. In some embodiments, a viscosity of the third mixture at a temperature between 5° C. and 30° C. may be between 5 cP and 25 cP, thereby being beneficial for the dipping of base cloth. In some embodiments, double rollers may be used for padding process on the base cloth after dipping, so as to remove the excess third mixture on the surface of the base cloth.

Next, the second thermal process is performed in step S40 to form the functional resin material and the moisture-sensed shrinking fabric, in which a reaction temperature of the second thermal process is between 120° C. and 150° C. In some embodiments, the reaction time of the second thermal process may be between 2 minutes and 5 minutes, so as to meet the requirements of the post-treatment of the industry. In detail, during the second thermal process, the second cross-linking agent may react with the amino group of the polyamine, and the ingredients in the third mixture may cover the base cloth and infiltrate into the base cloth, so as to form the functional resin material firmly disposed on the base cloth, and thereby forming the moisture-sensed shrinking fabric. As mentioned above, since the average molecular weight of the polyamine may be between 600 g/mole and 8000 g/mole, the moisture-sensed shrinking fabric formed subsequently can have good moisture-sensed shrinking property, washing fastness, and softness, and the manufacturing costs can be effectively reduced. Furthermore, since the average molecular weight of the polyamine is preferably between 800 g/mole and 5500 g/mole, the polyamine can be prevented from yellowing during the second thermal process.

In some embodiments, the base cloth of the moisture-sensed shrinking fabric has at least two layers. Specifically, the interlayers of the base cloth may be three-dimensional spaces naturally formed by yarns or fibers after being interwoven or stacked, and the yarns or fibers may be interwoven or entangled between the two layers of the base cloth. For example, when the base cloth of the moisture-sensed shrinking fabric is a woven fabric, the interlayers of the base cloth may be three-dimensional spaces formed by the interwoven warp and weft yarns. For another example, when the base cloth of the moisture-sensed shrinking fabric is a knitted fabric, the interlayers of the base cloth may be three-dimensional spaces formed after interlacing the yarns into yarn loops. For further examples, when the base cloth of the moisture-sensed shrinking fabric is a non-woven fabric, the interlayers of the base cloth may be may be gaps formed by the stacking of yarns (or fibers). In some embodiments, the functional resin material is disposed between the two layers of the base cloth to be firmly disposed on the base cloth. In this regard, the functional resin material can also wrap each yarn or fiber of the base cloth, so as to be disposed between the two layers of the base cloth.

After performing the above steps S10 to S40, the moisture-sensed shrinking fabric of the present disclosure can be obtained. Since the functional resin material in the moisture-sensed shrinking fabric has the hydroxyl groups derived from the polyol and the nanocellulose and the amino groups derived from the polyamine, the moisture-sensed shrinking fabric has a good moisture-sensed shrinking property and a high shrinking ratio per unit-area. In addition, the functional resin material formed by the two-stage thermal process can form a complicated network structure on the fibers or yarns in the base cloth, such that the functional resin material is even more firmly disposed on the base cloth. Accordingly, the formed moisture-sensed shrinking fabric can be ensured to have good moisture-sensed shrinking property and washing fastness.

In the following descriptions, features and effects of the present disclosure will be described more specifically with reference to some embodiments and comparative examples. It is noted that without exceeding the scope of the present disclosure, the materials used, their amount and ratio, processing details, processing flow, etc. can be appropriately alternated. Therefore, the present disclosure should not be interpreted restrictively by the embodiments provided below. The ingredients and their contents in each embodiment and comparative example are shown in Table 1. Each embodiment is manufactured through the aforementioned steps S10 to S40, in which the reaction temperature of the first and second thermal processes are respectively 110° C. and 130° C., and the reaction time of the first and second thermal processes are respectively 15 minutes and 3 minutes. It should be noted that the functional resin material in each embodiment and comparative example is disposed on the base cloth by utilizing a solvent such as water as a carrier.

TABLE 1

| | | functional resin material (coating amount 50 g/m², without water) | | | | |
|---|---|---|---|---|---|---|
| | base cloth | nano-cellulose | polyol | polyamine | first cross-linking agent | second cross-linking agen |
| comparative example 1 | PET woven fabric | N/A | PTMEG M.W.3000 (1) | polyethyleneimine M.W.5000 (3) | water-based bridging agent (2.4) | water-based bridging agent (0.6) |
| comparative example 2 | PET woven fabric | N/A | PPG M.W.3000 (1) | polyethyleneimine M.W.5000 (3) | water-based bridging agent (2.4) | water-based bridging agent (0.6) |
| comparative example 2 | PET woven fabric | N/A | PEG M.W.3000 (1) | polyethyleneimine M.W.5000 (3) | water-based bridging agent (2.4) | water-based bridging agent (0.6) |
| embodiment 1 | PET woven fabric | 0.01 | PTMEG M.W.3000 (1) | polyethyleneimine M.W.5000 (3) | water-based bridging agent (2.4) | water-based bridging agent (0.6) |

TABLE 1-continued

| | base cloth | nano-cellulose | polyol | polyamine | first cross-linking agent | second cross-linking agen |
|---|---|---|---|---|---|---|
| embodiment 2 | PET woven fabric | 0.01 | PPG M.W.3000 (1) | polyethyleneimine M.W.5000 (3) | water-based bridging agent (2.4) | water-based bridging agent (0.6) |
| embodiment 3 | PET woven fabric | 0.01 | PEG M.W.3000 (1) | polyethyleneimine M.W.5000 (3) | water-based bridging agent (2.4) | water-based bridging agent (0.6) |
| embodiment 4 | PET woven fabric | 0.02 | PEG M.W.3000 (1) | polyethyleneimine M.W.5000 (3) | water-based bridging agent (2.4) | water-based bridging agent (0.6) |
| embodiment 5 | PET woven fabric | 0.03 | PEG M.W.3000 (1) | polyethyleneimine M.W.800 (3) | water-based bridging agent (2.4) | water-based bridging agent (0.6) |
| embodiment 6 | PET woven fabric | 0.03 | PEG M.W.3000 (1) | polyethyleneimine M.W.5000 (3) | water-based bridging agent (2.4) | water-based bridging agent (0.6) | functional resin material (coating amount 50 g/m², without water)

Note 1:
The contents are shown in parentheses, and the unit of the content is parts by weight.
Note 2:
The basis weight of the base cloth is 295 g/m².
Note 3:
Nanocellulose is purchased from Dai-Ichi Kogyo Seiyaku Co Ltd, and its product name is I-2SX.
Note 4:
PEG is purchased from Merck; PPG and PTMEG are purchased from Bayer.
Note 5:
Polyethyleneimine is purchased from BASF.
Note 6:
Water-based bridging agent is purchased from Taiwan Textile Research Institute.
Note 5:
The term "M.W." stands for "molecular weight".

<Experiment: Moisture-Sensed Shrinking Test for Fabrics>

In this experiment, the fabric of each embodiment and comparative example is performed under a shrinking ratio per unit-area test. It should be noted that the shrinking ratio per unit-area test of fabric of each embodiment and comparative example is performed on a fabric with an area of 10 cm×10 cm. In addition, each embodiment and comparative example has further been subjected to 50 times of washing, and the test was performed again after 30 times and 50 times of washing. The results are shown in Table 2.

TABLE 2

| | number of washing (times) | shrinking ratio per unit-area of fabric (%) |
|---|---|---|
| comparative example 1 | 0 | 4.95 |
| | 30 | 3.96 |
| | 50 | 2.98 |
| comparative example 2 | 0 | 4.95 |
| | 30 | 3.96 |
| | 50 | 3.47 |
| comparative example 3 | 0 | 4.95 |
| | 30 | 3.96 |
| | 50 | 3.47 |
| embodiment 1 | 0 | 7.84 |
| | 30 | 5.91 |
| | 50 | 5.43 |
| embodiment 2 | 0 | 9.76 |
| | 30 | 7.36 |
| | 50 | 6.88 |
| embodiment 3 | 0 | 9.76 |
| | 30 | 7.85 |
| | 50 | 7.37 |
| embodiment 4 | 0 | 10.70 |
| | 30 | 8.82 |
| | 50 | 8.34 |
| embodiment 5 | 0 | 11.68 |
| | 30 | 8.84 |
| | 50 | 8.84 |
| embodiment 6 | 0 | 12.58 |
| | 30 | 9.31 |
| | 50 | 9.31 |

As shown in Table 2, no matter being washed or not, the shrinking ratio per unit-area of fabric of each embodiment has a better performance than the shrinking ratio per unit-area of fabric of each comparative example. This shows that the addition of nanocellulose can effectively improve the moisture-sensed shrinking property of fabric. Furthermore, after comparing embodiments 3, 4, and 6, it can be seen that the more nanocellulose added, the higher the shrinking ratio per unit-area of fabric is. In addition, after comparing embodiments 1 to 3, it can be seen that polyethylene glycol and polypropylene glycol can provide the fabric with a higher shrinking ratio per unit-area than poly(tetramethylene ether) glycol. Moreover, after comparing embodiments 5 and 6, it can be seen that when the average molecular weight of the polyamine is larger, the fabric can have a higher shrinking ratio per unit-area. On the other hand, the shrinking ratio per unit-area of each embodiment after 50 times of washing is still higher than that of each comparative example before washing, which successfully overcomes the problem of poor washing fastness caused by the use of conventional processing additives.

Accordingly to the aforementioned embodiments of the present disclosure, the moisture-sensed shrinking fabric includes the base cloth and the functional resin material. Since the functional resin material has a plurality of amino groups and hydroxyl groups and is firmly disposed on the base cloth, the moisture-sensed shrinking property of the moisture-sensed shrinking fabric can be improved, and the distance between the user's skin and the moisture-sensed shrinking fabric in a high-humidity environment can be enlarged, thereby enhancing the user's wearing comfort. During the manufacturing process of the moisture-sensed shrinking fabric, the functional resin material can be ensured to have a complicated network structure and thereby being firmly disposed on the base cloth by adjusting the reaction temperature of each stage of the two-stage thermal process, which is beneficial for improving the washing fastness of the moisture-sensed shrinking fabric. Accordingly, the moisture-sensed shrinking fabric of the present disclosure can still maintain its functions well after multiple times of washing, and can be widely used in the field of functional apparel textiles.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure covers modifications and variations of this disclosure provided they fall within the scope of the following claims.

What is claimed is:

1. A functional resin material, manufactured by the following reagents:
   a polyol;
   a polyamine;
   at least one cross-linking agent, wherein the cross-linking agent comprises an isocyanate block; and
   a nanocellulose, wherein the nanocellulose comprises a repeating unit represented by formula (1),

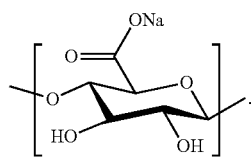

formula (1)

2. The functional resin material of claim 1, wherein a particle diameter of the nanocellulose is between 16 nm and 20 nm.

3. The functional resin material of claim 1, wherein an average molecular weight of the polyamine is between 600 g/mole and 8000 g/mole.

4. The functional resin material of claim 1, wherein an average molecular weight of the polyol is between 2000 g/mole and 10000 g/mole.

5. The functional resin material of claim 1, wherein the polyol is a ether polyol comprising polyethylene glycol, polypropylene glycol, or poly(tetramethylene ether) glycol.

6. The functional resin material of claim 1, wherein the polyamine comprises fatty amine, polyetheramine, polyamide, or polyimide.

7. The functional resin material of claim 6, wherein the fatty amine is hexamethylenediamine, diethylhexamethylenediamine, trimethylhexamethylenediamine, heptamethylenediamine, trimethylethylenediamine, nonamethylenediamine, tetramethylethylenediamine, tetraethylethylenediamine, laurylamine dipropylenediamine, diethylenetriamine, triethylenetetramine, or polyethyleneimine.

8. A manufacturing method of a functional resin material, comprising:
   performing a first thermal process to mix a polyol, a first cross-linking agent, and a nanocellulose, such that a first mixture is formed, wherein a reaction temperature of the first thermal process is between 90° C. and 120° C.;
   performing a second thermal process to mix the first mixture and a second mixture, such that the functional resin material is formed, wherein the second mixture comprises a second cross-linking agent and a polyamine, and a reaction temperature of the second thermal process is between 120° C. and 150° C.

9. The manufacturing method of the functional resin material of claim 8, wherein the first cross-linking agent and the second cross-linking agent have a same molecular structure.

10. The manufacturing method of the functional resin material of claim 8, wherein each of the first cross-linking agent and the second cross-linking agent comprises a structural unit represented by formula (2),

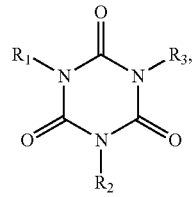

formula (2)

wherein any two or more of the R1, R2, and R3 comprises an isocyanate block.

11. The manufacturing method of the functional resin material of claim 8, wherein each of the first cross-linking agent and the second cross-linking agent comprises an isocyanate block, each of the polyol and the nanocellulose comprises a hydroxyl group, and a ratio of a total number of the isocyanate block to a total number of the hydroxyl group is between 1.0 and 2.5.

12. The manufacturing method of the functional resin material of claim 8, wherein a reaction time of the first thermal process is between 10 minutes and 30 minutes, and a reaction time of the second thermal process is between 2 minutes and 5 minutes.

13. A moisture-sensed shrinking fabric, manufactured by a manufacturing method comprising the following steps:

performing a first thermal process to mix a polyol, a first cross-linking agent, and a nanocellulose, such that a first mixture is formed, wherein a reaction temperature of the first thermal process is between 90° C. and 120° C.;

mixing the first mixture and a second mixture, such that a third mixture is formed, wherein the second mixture comprises a second cross-linking agent and a polyamine;

dipping a base cloth into the third mixture, such that the third mixture covers the base cloth and infiltrates into the base cloth; and performing a second thermal process, such that the third mixture is formed into a functional resin material, and the functional resin material is disposed on the base cloth to form the moisture-sensed shrinking fabric, wherein a reaction temperature of the second thermal process is between 120° C. and 150° C.

14. The moisture-sensed shrinking fabric of claim 13, wherein the base cloth has at least two layers, and the functional resin material is disposed between the two layers of the base cloth.

15. The moisture-sensed shrinking fabric of claim 13, wherein a particle diameter of the nanocellulose is between 16 nm and 20 nm.

16. The moisture-sensed shrinking fabric of claim 13, wherein an average molecular weight of the polyamine is between 600 g/mole and 8000 g/mole.

17. The moisture-sensed shrinking fabric of claim 13, wherein a viscosity of the third mixture at a temperature between 5° C. and 30° C. is between 5 cP and 25 cP.

* * * * *